(12) United States Patent
Dravantti

(10) Patent No.: US 11,472,106 B2
(45) Date of Patent: Oct. 18, 2022

(54) STEREOLITHOGRAPHY APPARATUS AND METHOD FOR CALIBRATION OF THE STEREOLITHOGRAPHY APPARATUS

(71) Applicant: PLANMECA OY, Helsinki (FI)

(72) Inventor: Samppa Dravantti, Helsinki (FI)

(*) Notice: Subject to any disclaimer, the term of this patent is extended or adjusted under 35 U.S.C. 154(b) by 105 days.

(21) Appl. No.: 17/256,276

(22) PCT Filed: Mar. 11, 2019

(86) PCT No.: PCT/FI2019/050200
§ 371 (c)(1),
(2) Date: Dec. 28, 2020

(87) PCT Pub. No.: WO2020/002759
PCT Pub. Date: Jan. 2, 2020

(65) Prior Publication Data
US 2021/0260824 A1 Aug. 26, 2021

(30) Foreign Application Priority Data
Jun. 28, 2018 (FI) ...................................... 20185582

(51) Int. Cl.
*B29C 64/245* (2017.01)
*B33Y 30/00* (2015.01)
(Continued)

(52) U.S. Cl.
CPC .......... *B29C 64/245* (2017.08); *B29C 64/124* (2017.08); *B29C 64/232* (2017.08); *B33Y 30/00* (2014.12)

(58) Field of Classification Search
CPC ... B29C 64/124; B29C 64/232; B29C 64/245; B33Y 30/00
See application file for complete search history.

(56) References Cited

U.S. PATENT DOCUMENTS 4,297,047 A * 10/1981 Farrant ............... F16C 11/0638
403/138
9,827,713 B1 * 11/2017 Linnell ................. B29C 64/124
(Continued)

FOREIGN PATENT DOCUMENTS

WO 2013177620 A1 12/2013
WO 2017122167 A1 7/2017

OTHER PUBLICATIONS

International Search Report for PCT Application No. PCT/FI2019/050200, dated Jul. 3, 2019, 2 pages.

*Primary Examiner* — Manley L Cummins, IV
(74) *Attorney, Agent, or Firm* — Fay Sharpe LLP

(57) ABSTRACT

A stereolithography apparatus comprises a build platform (8) connected to a movable frame (11) via a ball joint (12). The ball joint (12) permits a limited range of movement of the build platform in all directions. A locking mechanism (13) is configured to lock the ball joint (12) stationary for calibration of the orientation angle of the build platform (8) in relation to the exposure arrangement (6), so that the lower surface (9) of the build platform is parallel with the second upper surface (7) of the exposure arrangement (6). The ball joint (12) comprises a ball member (14) attached to the build platform (8) and a socket member (16; 16-1, 16-2) connected to the frame (11). A vertical guide (18) is arranged in the frame (11). The socket member (16) is arranged movable vertically inside and along the guide (18) to permit a limited vertical movement of the socket member (16) in relation to the frame (11). The locking mechanism (13) is configured to lock also the socket member (16; 16-1, 16-2) stationary for calibration of the vertical position of the build platform to determine a zero level of the build platform (8) in relation to the second upper surface (7) of the exposure arrangement (6).

11 Claims, 3 Drawing Sheets

(51) Int. Cl.
*B29C 64/232* (2017.01)
*B29C 64/124* (2017.01)

(56) References Cited

U.S. PATENT DOCUMENTS

| | | | |
|---|---|---|---|
| 2014/0085620 A1* | 3/2014 | Lobovsky | B33Y 10/00 |
| | | | 355/72 |
| 2015/0064298 A1* | 3/2015 | Syao | B29C 64/124 |
| | | | 425/169 |
| 2015/0151489 A1* | 6/2015 | Elsey | B29C 64/135 |
| | | | 264/401 |
| 2015/0183168 A1 | 7/2015 | Liverman et al. | |
| 2017/0246797 A1 | 8/2017 | Lambrecht et al. | |

* cited by examiner

STEREOLITHOGRAPHY APPARATUS AND METHOD FOR CALIBRATION OF THE STEREOLITHOGRAPHY APPARATUS

FIELD OF THE INVENTION

The invention concerns the technology of stereolithographic 3D printing, also known as stereolithographic additive manufacturing. In particular the invention concerns a stereolithography apparatus for "bottom-up" fabrication of three-dimensional objects. Further, the present invention relates to a method for calibration of the stereolithography apparatus.

BACKGROUND OF THE INVENTION

Stereolithography is a 3D printing or additive manufacturing technique in which optical radiation is used to photopolymerize suitable raw material to produce the desired object. The raw material comes to the process in the form of a resin. A vat is used to hold an amount of resin, and a build platform is moved in the vertical direction so that the object to be produced grows layer by layer onto a build surface of the build platform. The present description concerns in particular the so-called "bottom up" variant of stereolithography, in which the photopolymerizing optical radiation comes from below the vat and the build platform moves upwards away from the remaining resin as the manufacturing proceeds.

The stereolithography apparatus comprises a vat for holding photosensitive light-curable polymer for use in a stereolithographic 3D printing process. The vat has a transparent bottom made of flexible film material. The apparatus further comprises a table having a horizontal first upper surface on which the vat is placeable. The table has an opening. The apparatus further comprises an exposure arrangement arranged at the opening of the table for providing an electromagnetic radiation pattern of a print layer to be 3D printed from below the vat. The exposure arrangement comprises a second upper surface which is flush with the first upper surface of the table. The exposure arrangement comprises a build platform, having a lower surface on which the object to be 3D printed can be built up. The apparatus further comprises an elevator mechanism comprising a movable frame, the frame being movable in a vertical direction between extreme positions including a first position in which the lower surface of the build platform is at a distance from the bottom of the vat and a second position in which the lower surface of the build platform is pressed against the bottom of the vat.

In order to form the three-dimensional object with precise shape and dimensions, the lower surface of the build platform must be orientated precisely parallel to the second upper surface of the exposure arrangement. Further, the zero level of the vertical movement of the elevator mechanism must be exactly at the same level where the lower surface of the build platform is in full contact with the transparent bottom of the vat which, in turn, is pressed against the second upper surface of the exposure arrangement. This is because the printing process must be initiated exactly from the zero level and not above it. On the other hand, the zero level of the elevator mechanism must not be at a lower level than the level of the second upper surface, so that the build platform does not collide with the exposure arrangement.

OBJECTIVE OF THE INVENTION

The objective of the invention is to meet and solve the challenges mentioned above.

SUMMARY OF THE INVENTION

According to a first aspect, the present invention provides a stereolithography apparatus, comprising
  a vat for holding photosensitive polymer resin for use in a stereolithographic 3D printing process, the vat having a transparent bottom made of flexible film material,
  a table having a horizontal first upper surface on which the vat is placeable, the table having an opening,
  an exposure arrangement arranged at the opening of the table for providing an electromagnetic radiation pattern of a print layer to be 3D printed from below the vat, the exposure arrangement comprising a second upper surface which is flush with the first upper surface of the table,
  a build platform, having a lower surface on which the object to be 3D printed can be built up, and
  an elevator mechanism comprising a movable frame, the frame being movable in a vertical direction between extreme positions including a first position in which the lower surface of the build platform is at a distance from the bottom of the vat and a second position in which the lower surface of the build platform is pressed against the bottom of the vat. According to the invention the build platform is connected to the frame via a ball joint, the ball joint allowing a limited range of movement of the build platform in all directions, and a locking mechanism is configured to lock the ball joint stationary for calibration of the orientation angle of the build platform in relation to the exposure arrangement so that the lower surface of the build platform is parallel with the second upper surface of the exposure arrangement. The ball joint comprises a ball member attached to the build platform, the ball member having a convex spherical outer surface, and a socket member connected to the frame, the socket member having a concave spherical inner surface adapted to receive the convex spherical outer surface of the ball member therein. A vertical guide is arranged in the frame, the socket member being arranged movable vertically inside and along the guide to permit a limited vertical movement of the socket member in relation to the frame, and the locking mechanism is configured to lock the socket member stationary for calibration of the vertical position of the build platform to determine a zero level of the build platform in relation to the second upper surface of the exposure arrangement.

The advantage of the invention is that the vertically movable ball joint lockable to a desired position provides for adjusting and fixing the tilt orientation of the build platform while it provides for adjusting and fixing the zero level.

In an embodiment of the stereolithography apparatus, the apparatus comprises a shaft extending vertically through the guide, the shaft comprising the ball member.

In an embodiment of the stereolithography apparatus the ball member is monolithic with the shaft.

In an embodiment of the stereolithography apparatus, the shaft comprises a lower flange part having an attachment to which the build platform is attachable.

In an embodiment of the stereolithography apparatus, the socket member has a cylindrical outer periphery, and the guide has a cylindrical inner surface adapted to receive the cylindrical outer periphery of the socket member with a sliding fit.

In an embodiment the stereolithography apparatus, the socket member is split into two socket member halves.

In an embodiment of the stereolithography apparatus, the guide is split into two guide halves comprising a first guide half and a second guide half.

In an embodiment of the stereolithography apparatus, the frame comprises a first frame part which is attached to a bracket which is movable by the elevator mechanism, the first guide half being formed in the first frame part, and a second frame part which is removably attachable to the first frame part, the second guide half being formed in the second frame part The first frame part and the second frame part are lockable to each other by the locking mechanism.

According to a second aspect, the present invention provides a method for calibration of the stereolithography apparatus according to the first aspect. The method comprises steps of: unlocking the locking mechanism, while the frame is at, the first position, to allow free turning and vertical movement: of the build platform in relation to the frame; lowering the frame to the second position so that the lower surface of the build platform is against the upper surface of the exposure arrangement and the lower surface becomes accurately aligned with and parallel to the second upper surface for calibration of the position of the build platform to determine a zero level of the build platform in relation to the second upper Surface of the exposure arrangement; and locking the locking, mechanism to lock the build platform in the calibrated position stationary in relation to the frame.

In an embodiment of the stereolithography apparatus, the apparatus is a 3D printer for fabrication of dental objects. It may be a 3D printer for creating dental splints, models, surgical guides, temporary fillings and orthodontic models with true precision and efficiency.

It is to be understood that the aspects and embodiments of the invention described above may be used in any combination with each other. Several of the aspects and embodiments may be combined together to form a further embodiment of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1A:
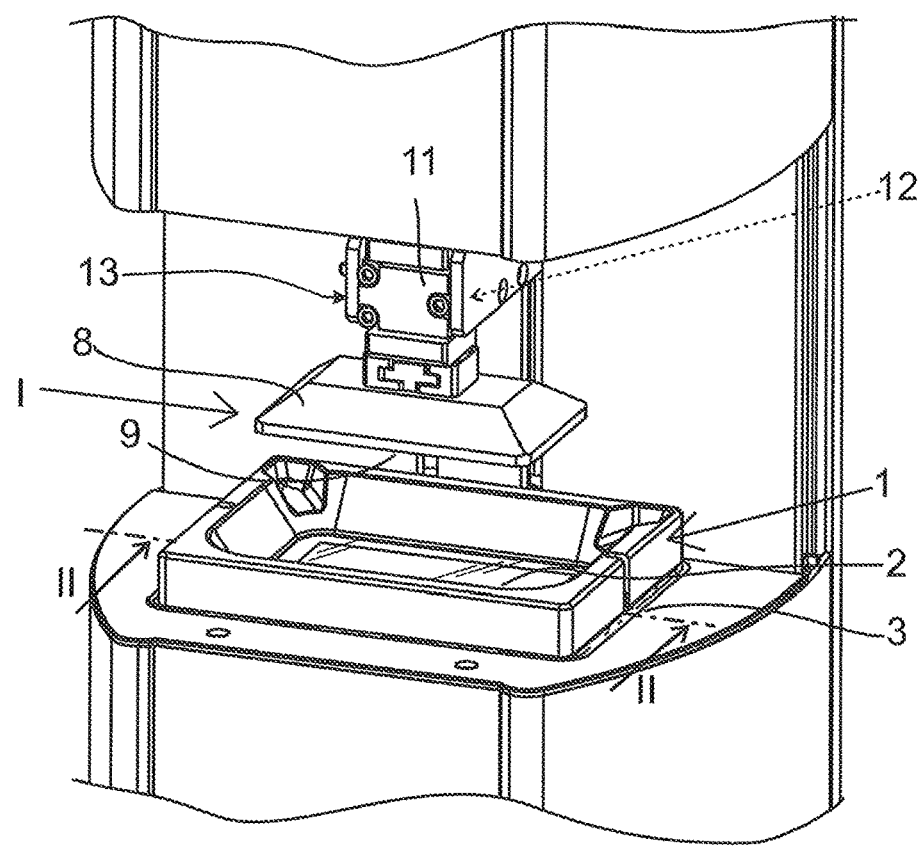
FIG. 1a shows a partial axonometric view of a stereolithography apparatus according to an embodiment of the invention, the build platform being in a first position.
Figure 1B:
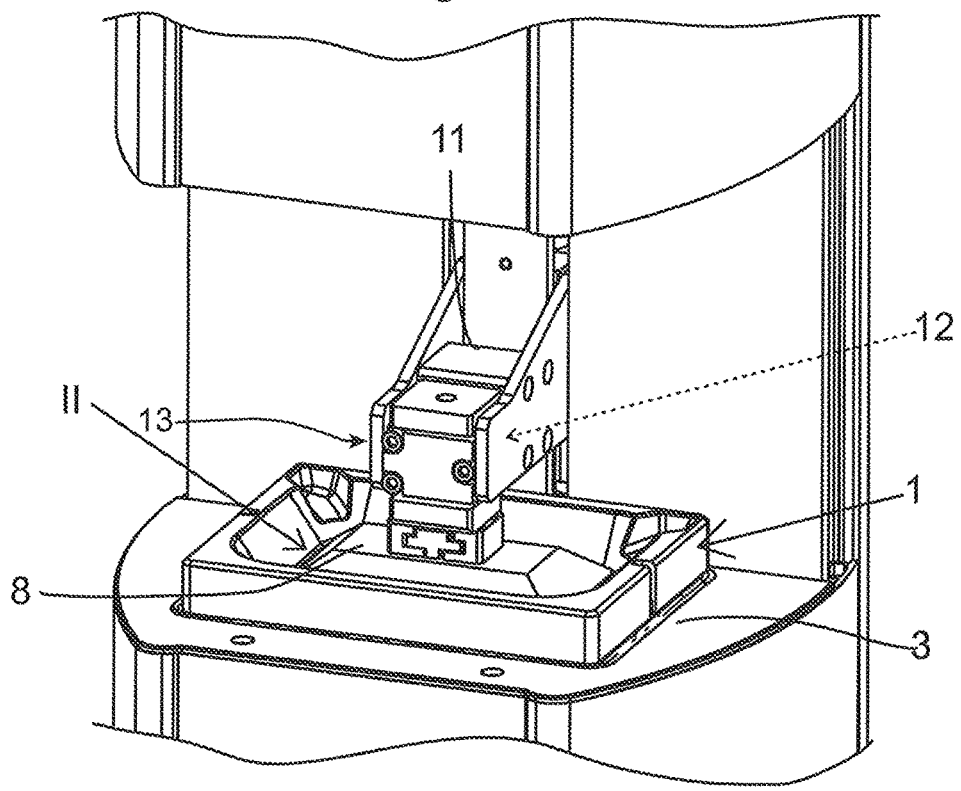
FIG. 1b shows the stereolithography apparatus of FIG. 1a, the build platform being in a second position, FIG. 2. is a cross-section II-II from FIG. 1.
Figure 3:
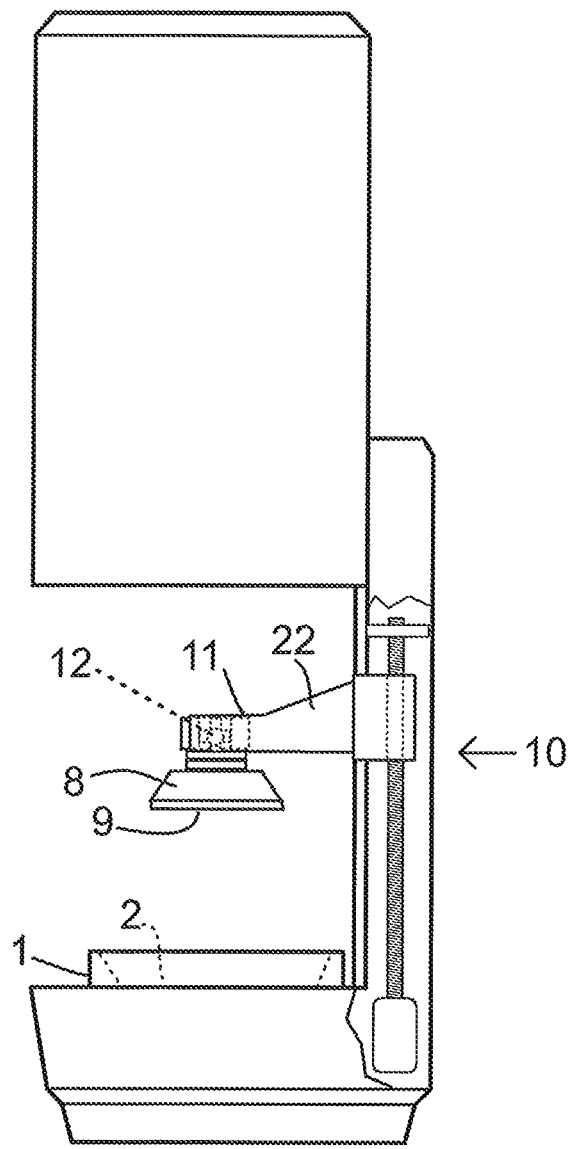
FIG. 3 is a schematic side view of a stereolithography apparatus according to an embodiment of the invention.
Figure 4:
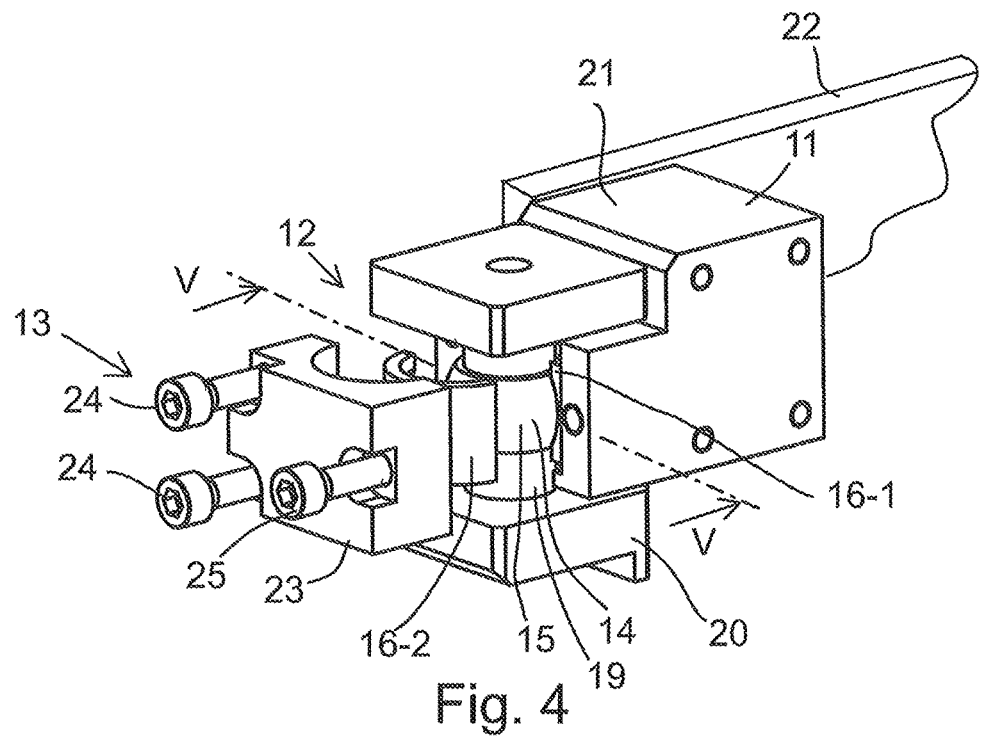
FIG. 4 is an axonometric partly exploded view of a detail of the stereolithography apparatus of FIG. 1 showing a detail of the frame including the ball joint.
Figures 5, 6:
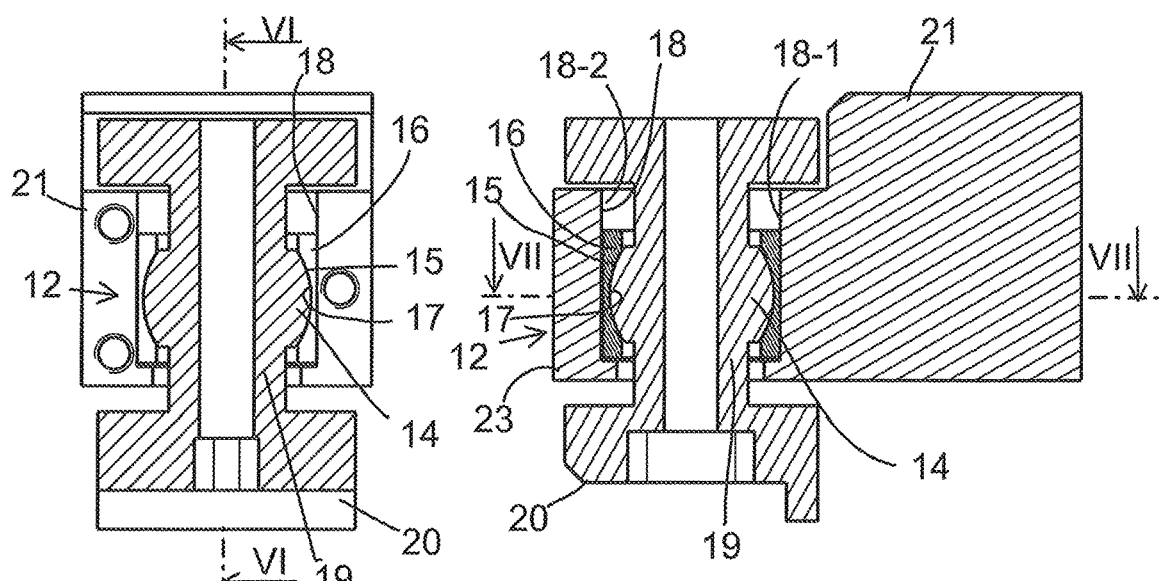
FIG. 5 is a cross-section V-V from FIG. 4.
FIG. 6 is a cross-section VI-VI from FIG. 5.
Figure 7:
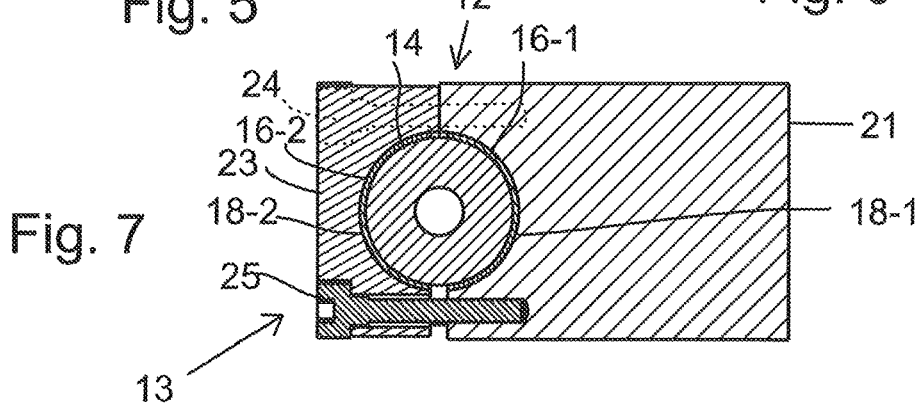
FIG. 7 is a cross-section VII-VII from FIG. 6.

FIGS. 1a, 1b and 3 show a stereolithography apparatus which can be used for "bottom-up" three-dimensional printing of three-dimensional objects.

Figure 2:
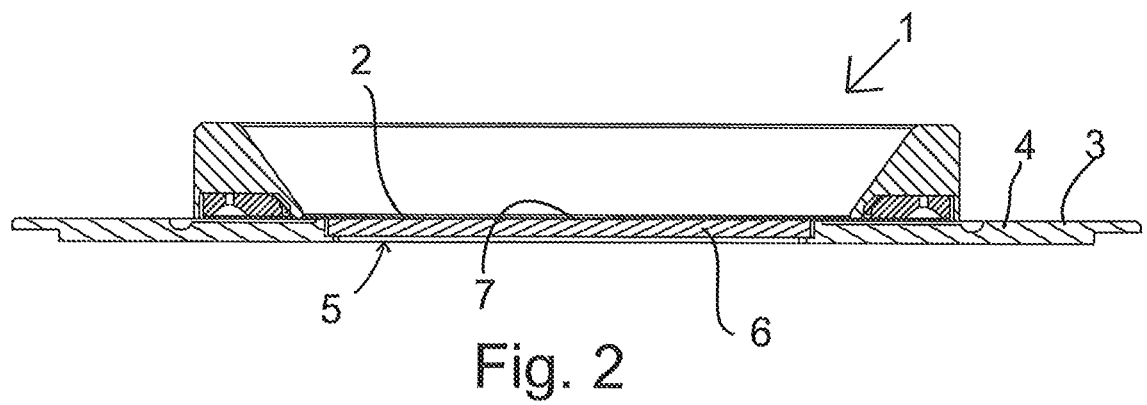

The stereolithography apparatus comprises a vat 1 for holding photosensitive light-curable: polymer for use in a stereolithographic 3D printing process. The vat 1 has a transpnrent bottom 2 made of flexible film material. The film material may be a thin FEP (Fluorinated ethylene propylene) film. The thickness of the film is of the order of 0.1 mm and it is highly tensioned like "a drumhead" to a rim of the vat 1 (see also FIG. 2) to form the transparent bottom 2 thereof.

The stereolithography apparatus comprises a table 3 having a horizontal first upper surface 4 on which the vat 1 is placeable. In FIGS. 1a, 1b, 2 and 3 can be seen the vat 1 being placed on the table 3, Referring to FIG. 2, the table has an opening 5. An exposure arrangement 6 is arranged at the opening 5 of the table 3. The exposure arrangement 6 provides, from below of the vat 1, an electromagnetic radiation pattern of a print layer to be printed and cured. The exposure arrangement 6 comprises a planar second upper surface 7 which is flush with the first upper surface 4 of the table 8. In an embodiment the exposure arrangement 6 may be an LCD display, the upper surface of which being said planar second upper surface 7. In another not-shown embodiment the exposure arrangement 6, the electromagnetic radiation pattern may be projected by a projector device on a transparent screen plate whereby the planar second upper surface 7 is the upper surface of the screen plate.

Referring to FIGS. 1a, 1b and 3, the stereolithography apparatus comprises a build platform 8 having a planar lower surface 9 on which the object to be 3D printed can be built up.

FIG. 3 schematically shows an elevator mechanism 10 comprising a movable frame 11, the frame 11 being movable in a vertical direction. The elevator mechanism 10 comprises a linear actuator, such as a ball screw mechanism or like, which is able to provide precise positioning. The frame 11 is movable between extreme positions including a first position I and a second position II. In the first position I shown in FIG. 1a the planar lower surface 9 of the build platform is at a distance from the bottom 2 of the vat 1. In the second position II shown in FIG. 1b the planar lower surface 8 of the build platform 8 is pressed against the transparent bottom 2 of the vat 1, and thus the planar lower surface 8 is also against the planar second surface 7 of the exposure arrangement 6, the transparent bottom 8 being therebetween.

The build platform 8 is connected to the frame 11 via a ball joint 12. The ball joint 12 allows a limited range of movement of the build platform 8 in all directions. A locking mechanism 13 is configured to lock the ball joint 12 stationary for calibration of the orientation angle of the build platform 8 in relation to the exposure arrangement 6, so that the planar lower surface 9 of the build platform 8 can be oriented to be exactly parallel with the planar second upper surface 7 of the exposure arrangement 6.

FIGS. 4 to 7 show the structure of the ball joint 12. The ball joint 12 comprises a ball member 14 which can be attached to the build platform 8 (not shown in FIGS. 7 to 7). The ball member 14 has a convex spherical outer surface 15. A socket member 16; 16-1, 16- is 2 connected to the frame 11. The socket member 16; 16-1, 16-2 has a concave spherical inner surface 17 adapted to receive the convex spherical outer surface 15 of the ball member 14 therein.

A vertical guide 18 is arranged in the frame 11. The socket member 16 is arranged movable vertically inside and along the guide 18 to permit a limited vertical movement of the socket member 16 in relation to the frame 11. The locking mechanism 13 is configured to lock the socket member 16; 16-1, 16-2 stationary for calibration of the vertical position of the build platform to determine a zero level, of the build platform 8 in relation to the planar second upper surface 7 of the exposure arrangement 6.

The apparatus comprises a shaft 19 extending vertically through the guide 18, the shaft 19 comprising the ball member 14. The ball member 14 monolithic with the shaft 19. The shaft 19 comprises a lower flange part 20 having an attachment to which the build platform 8 is attachable. The socket member 16 has a cylindrical outer periphery, and the guide 18 has a cylindrical inner surface adapted to receive the cylindrical enter periphery of the socket member with a sliding fit to enable movement in vertical direction only.

The socket member 16 is split into two socket member halves 16-1, 16-2. Also the guide 18 is split into two guide halves 18-1, 18-2 comprising a first guide half 18-1 and a second guide half 18-2.

The frame 11 comprises a first frame part 21 which is attached to a bracket 22 which is movable by the elevator mechanism 10. The first guide half 18-1 is formed in the first frame part 21. The frame 11 further comprises a second frame part 23 which is removably attachable to the first frame part 21. The second guide half 18-2 is formed in the second frame part 23. The first frame part 21 and the second frame part 22 are lockable to each other by the locking mechanism 13.

The locking mechanism 13 comprises two securing screws 24 at a first side of the guide 18 for securing the first frame part 21 and the second frame part 23 together. The locking mechanism 13 further comprises a tightening screw 25 at a second side of the guide 18. The second side is opposite to the first side. While joining the first frame part 21 and the second frame part 23 together the locking mechanism 13 simultaneously clamps the ball joint 12 and the socket member 16 stationary.

In a method for calibration of the stereolithography apparatus as disclosed and shown in the Figures, the method comprises the following steps. While the frame 11 is at the first position I shown in FIG. 1, the locking mechanism 13 in unlocked to allow free turning and vertical movement of the build platform 8 in relation to the frame 11. Then the frame 11 is lowered to the second position II shown in FIG. 2, so that the planar lower surface 9 of the build platform 8 is against planar upper surface 7 of the exposure arrangement 6 and the lower surface 9 becomes accurately aligned with and parallel to the planar second upper surface 7 for calibration of the tilt angle and position of the build platform 8 and to determine a zero level of the build platform 8 in relation to the planar second upper surface 7 of the exposure arrangement 6. In this position the locking mechanism 13 is locked to lock the build platform 8 in the calibrated position stationary in relation to the frame 11.

The calibration procedure needs to be performed occasionally before fabrication of the 3D objects is started with the stereolithography apparatus. Calibration process should be performed every time when something is changed in the apparatus so that one can assume that the zero level has changed, for example the LCD display is replaced, the elevator mechanism is maintained etc.

It is obvious to a person skilled in the art that with the advancement of technology, the basic idea of the invention may be implemented in various ways. The invention and its embodiment are thus not limited to the examples described above, but instead may vary within the scope of the claims.

The invention claimed is:

1. A stereolithography apparatus, comprising
a vat for holding photosensitive light-curable polymer for use in a stereolithographic 3D printing process, the vat having a transparent bottom made of flexible film material,
a table having a horizontal first upper surface on which the vat is placeable, the table having an opening,
an exposure arrangement arranged at the opening of the table for providing, from below of the vat, an electromagnetic radiation pattern of a print layer to be printed, the exposure arrangement comprising a second upper surface which is flush with the first upper surface of the table,
a build platform, having a lower surface on which the object to be 3D printed can be built up,
an elevator mechanism comprising a movable frame, the frame being movable in a vertical direction between extreme positions including a first position in which the lower surface of the build platform is at a distance from the bottom of the vat and a second position in which the lower surface of the build platform is pressed against the bottom of the vat, and
a locking mechanism,
wherein the build platform is connected to the frame via a ball joint, the ball joint allowing a limited range of movement of the build platform in all directions, and the locking mechanism is configured to lock the ball joint stationary for calibration of an orientation angle of the build platform in relation to the exposure arrangement so that the lower surface of the build platform is parallel with the second upper surface of the exposure arrangement,
wherein the ball joint comprises a ball member attached to the build platform, the ball member having a convex spherical outer surface, and a socket member connected to the frame, the socket member having a concave spherical inner surface adapted to receive the convex spherical outer surface of the ball member therein, and
wherein a vertical guide is arranged in the frame, the socket member being arranged movable vertically inside and along the guide to permit a limited vertical movement of the socket member in relation to the frame, and wherein the locking mechanism is configured to lock the socket member stationary for calibration of a vertical position of the build platform to determine a zero level of the build platform in relation to the second upper surface of the exposure arrangement.

2. A stereolithography apparatus according to claim 1, wherein the apparatus comprises a shaft extending vertically through the guide, the shaft comprising the ball member.

3. A stereolithography apparatus according to claim 2, wherein the ball member is monolithic with the shaft.

4. A stereolithography apparatus according to claim 2, wherein the shaft comprises a lower flange part having an attachment to which the build platform is attachable.

5. A stereolithography apparatus according to claim 1, wherein the socket member has a cylindrical outer periphery, and the guide has a cylindrical inner surface adapted to receive the cylindrical outer periphery of the socket member with a sliding fit.

6. A stereolithography apparatus according to claim 1, wherein the socket member is split into two socket member halves.

7. A stereolithography apparatus according to claim 1, wherein the guide is split into two guide halves comprising a first guide half and a second guide half.

8. A stereolithography apparatus according to claim 1, wherein the locking mechanism comprises a single tightening screw for simultaneously clamping the ball member and the socket member stationary.

9. A stereolithography apparatus according to claim 7, wherein the frame comprises
- a first frame part which is attached to a bracket which is movable by the elevator mechanism, the first guide half being formed in the first frame part, and
- a second frame part which is removably attachable to the first frame part, the second guide half being formed in the second frame part,
- wherein the first frame part and the second frame part are lockable to each other by the locking mechanism.

10. A stereolithography apparatus according to claim 9, wherein the locking mechanism comprises
- a securing screw at a first side of the guide for securing the first frame part and the second frame part together, and
- a tightening screw at a second side of the guide, the second side being opposite to the first side, for joining the first frame part and the second frame part together and for simultaneously clamping the ball member and the socket member stationary.

11. A method for calibration of the stereolithography apparatus according to claim 1, the method comprising steps of
- unlocking the locking mechanism, while the frame is at the first position, to allow free turning and vertical movement of the build platform in relation to the frame,
- lowering the frame to the second position so that the lower surface of the build platform is against the second upper surface of the exposure arrangement and the lower surface becomes accurately aligned with and parallel to the second upper surface for calibration of the vertical position,
- locking the locking mechanism which simultaneously locks the build platform in the calibrated orientation angle and zero level position stationary in relation to the frame.

* * * * *